US012172253B1

(12) United States Patent
Rabbe, Jr.

(10) Patent No.: US 12,172,253 B1
(45) Date of Patent: Dec. 24, 2024

(54) DEBRIS MANAGEMENT SYSTEM FOR BOTH POSITIVE AND NEGATIVE PRESSURE DUST COLLECTORS

(71) Applicant: Gilbert Otis Rabbe, Jr., Hurst, TX (US)

(72) Inventor: Gilbert Otis Rabbe, Jr., Hurst, TX (US)

( * ) Notice: Subject to any disclaimer, the term of this patent is extended or adjusted under 35 U.S.C. 154(b) by 0 days.

(21) Appl. No.: 18/659,199

(22) Filed: May 9, 2024

Related U.S. Application Data (60) Provisional application No. 63/529,389, filed on Jul. 28, 2023.

(51) Int. Cl.
| | |
|---|---|
| *B01D 46/48* | (2006.01) |
| *B01D 50/20* | (2022.01) |
| *B23Q 11/00* | (2006.01) |
| *B27G 3/00* | (2006.01) |
| *B04C 9/00* | (2006.01) |

(52) U.S. Cl.
CPC ............ *B23Q 11/005* (2013.01); *B01D 46/48* (2013.01); *B01D 50/20* (2022.01); *B27G 3/00* (2013.01); *B04C 2009/002* (2013.01)

(58) Field of Classification Search
CPC ...... B23Q 11/005; B01D 46/48; B01D 50/20; B27G 3/00; B04C 2009/002
See application file for complete search history.

(56) References Cited

U.S. PATENT DOCUMENTS

| | | | | |
|---|---|---|---|---|
| 3,485,671 A | * | 12/1969 | Stephens | F24F 13/02 55/315 |
| 4,838,907 A | * | 6/1989 | Perry | A47L 9/20 55/482 |
| 4,917,712 A | * | 4/1990 | Crigler | B01D 46/02 55/432 |
| 6,178,590 B1 | * | 1/2001 | Lindsay, III | A47L 9/1418 15/352 |
| D531,769 S | * | 11/2006 | Lin | D32/21 |
| 7,282,074 B1 | * | 10/2007 | Witter | B24B 55/06 451/87 |
| D651,776 S | * | 1/2012 | Cheng | D32/21 |
| 8,695,158 B2 | * | 4/2014 | Cheng | B01D 46/42 55/357 |
| 9,017,441 B1 | * | 4/2015 | Vemuri | A47L 9/125 55/432 |
| D741,985 S | * | 10/2015 | Ma | D23/365 |
| 10,265,652 B1 | * | 4/2019 | Cheng | B01D 46/48 |

(Continued)

*Primary Examiner* — Dung H Bui
(74) *Attorney, Agent, or Firm* — James E. Walton (57) ABSTRACT

A system and method for making new dust collectors or modifying existing dust collectors includes a containment chamber underneath the bottom exit of a dust collector unit and an independent, unconnected debris container. A metal, plastic, or flexible material chute may be required to direct debris from the dust collector open bottom to the debris container. The containment chamber is equipped with a covered opening, e.g., door or hatch, of sufficient size to insert and remove the debris container. The system may be used with both positive and negative pressure systems. User benefits include lower handling costs and greater convenience in debris management. The system and method have wide application in woodworking operations, as well as, with other applications where particulate matter needs to be removed from an air stream.

17 Claims, 7 Drawing Sheets

(56) References Cited

U.S. PATENT DOCUMENTS

| | | | | |
|---|---|---|---|---|
| D917,806 S | * | 4/2021 | Fitzsimmons | D32/21 |
| 11,458,485 B2 | * | 10/2022 | Fitzsimmons | A47L 9/1683 |
| 2005/0076624 A1 | * | 4/2005 | Cho | A47L 5/365 |
| | | | | 55/467 |
| 2006/0277714 A1 | * | 12/2006 | Dunning | B02C 18/14 |
| | | | | 15/340.2 |
| 2007/0022564 A1 | * | 2/2007 | Witter | A47L 9/14 |
| | | | | 15/353 |
| 2007/0028569 A1 | * | 2/2007 | Murphy | B01D 46/02 |
| | | | | 55/337 |
| 2007/0298695 A1 | * | 12/2007 | Witter | B24B 7/18 |
| | | | | 451/350 |
| 2009/0119870 A1 | * | 5/2009 | Nilsson | B24B 55/06 |
| | | | | 15/347 |
| 2010/0037572 A1 | * | 2/2010 | Cheng | A47L 9/1608 |
| | | | | 55/369 |
| 2011/0100225 A1 | * | 5/2011 | Lin | B04C 5/13 |
| | | | | 96/421 |
| 2011/0203237 A1 | * | 8/2011 | Witter | B01D 46/42 |
| | | | | 55/337 |
| 2012/0055336 A1 | * | 3/2012 | Matsuno | B23Q 11/005 |
| | | | | 95/205 |
| 2014/0093301 A1 | * | 4/2014 | Cho | A47L 9/1683 |
| | | | | 403/24 |
| 2018/0169558 A1 | * | 6/2018 | Cheng | B01D 46/681 |
| 2019/0015840 A1 | * | 1/2019 | Wulfert | B04C 5/28 |
| 2019/0255476 A1 | * | 8/2019 | Silvestro | B01D 46/4227 |
| 2021/0186284 A1 | * | 6/2021 | Lin | A47L 9/1409 |
| 2023/0172413 A1 | * | 6/2023 | Elmestrand | A47L 9/1675 |
| | | | | 15/347 |

\* cited by examiner

DEBRIS MANAGEMENT SYSTEM FOR BOTH POSITIVE AND NEGATIVE PRESSURE DUST COLLECTORS

This application claims the benefit of U.S. Provisional Application No. 63/529,389, filed 28 Jul. 2023, titled "Debris Management System for Both Positive and Negative Pressure Dust Collectors," which is incorporated herein for all purposes.

BACKGROUND

1. Field of the Invention

The present application generally relates to dust collectors, and more particularly, to the structure of the dust collector and the waste debris container.

2. Description of Related Art

Dust collectors are used when work, maintenance, or cleaning activities generate air borne particles, shavings, chips, dust or similar particulate matter. Typically, the particulate matter will be drawn into an air stream that is directed to a dust collector. The blower, fan, or other air moving equipment may be positioned either before the dust collector inlet or connected to the dust collector exit. If the air movement equipment is in advance of the dust collector, then the dust collector will be in a positive pressure mode relative to ambient atmospheric pressure. If the dust collector is in advance of the blower, fan or other motive equipment, the dust collector will be under a negative pressure or vacuum relative to atmospheric pressure.

Both positive and negative pressure dust collectors are designed and operated with a particulate solids discharge port that is connected directly to a waste debris container such as a drum, barrel, bag, or similar item. The designs that are an exception to this practice depend on a mechanical device such as an air lock on the discharge port or in the case of a negative pressure collector, may use a collapsible duckbill sleeve (Aerodyne Vacu-Valve® Platypus and Vacu-Valve® Armadillo). The direct connection of the waste debris container to the dust collector requires the use of band clamps, drum seal rings, or other unique closure devices to seal the container to the collector.

The typical positive pressure dust collector design receives dust-laden air from a blower or fan through a tangential port that creates a swirl or vortex to force larger particles downward into a substantially air-impermeable collection bag physically attached to the dust collector body with an effective, but somewhat ergonomically challenging heavy-duty metal or polymer band clamp. The air exits the dust collector through a bag filter or cartridge filter. Debris collected on the bag filter or cartridge filter media may also drop into the collection bag, depending on system design. Due to the positive pressure of this system, the bag is typically a heavy-duty poly plastic or similar strong film or air-impermeable material with an associated higher price as the bag will need to withstand the force of the air flowing within. Users typically empty and reuse the bags when possible due to the bag cost, but wear and tear can lead to leaks that allow a positive pressure dust laden stream to escape into the work area.

The typical negative pressure dust collector design utilizes some style of cyclone separator that forces the majority of the debris through a debris port into an integrally connected rigid container such as a drum that can support the negative system pressure or into a durable, substantially air-impermeable bag that has an internal support cage or grid device to prevent the bag from either collapsing or being sucked up to block the discharge port. Various methods are utilized to connect the rigid debris container to the body of the cyclone including a large diameter flexible hose or bellows, drum ring clamps, and flanges. Alternatively, a poly plastic or similar bag may be attached with a band clamp to the discharge port provided a method is utilized to prevent the bag from being sucked up over or into the discharge port and disrupt the operation. With special precautions, a bag may be used inside a rigid debris container but can be hard to remove from the container when filled.

DESCRIPTION OF THE DRAWING

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

While the method and device of the present application are susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of a dust collector debris management system according to the present application are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming but would nevertheless be a routine undertaking for those of ordinary skill in the art having the benefit of this disclosure. It is also appreciated that the use of "a" or "an" before a noun naming an object is construed to be that the noun refers to both the singular and the plural.

In accordance with an aspect of this application, a dust collector receives a dust-laden air stream typically through a side entry port and discharges cleaned air typically through a top oriented exit route. The separated particulate debris typically exits via an open bottom, generally cylindrical or conical shaped section to which a substantially air-impermeable containment chamber is attached, e.g. using permanent sealing adhesive, mechanical connection, or equivalent. The attached containment chamber is constructed of a durable material capable of supporting the operating pressure of the dust collector. Typically, metal, plastic, wood, or structurally supported films and fabric are viable material choices for the containment chamber.

Placed inside the containment chamber and underneath the bottom exit of the dust collector unit is an independent, unconnected debris container. A metal, plastic, or flexible material chute may be required to direct debris from the dust collector open bottom to the debris container, depending on the size of the bottom opening compared to the size and height of the top of the debris container. In positive pressure dust collectors, the inlet air forces the dust towards the top of the system where a filter will catch any debris while the air exists the dust collector. While larger debris will fall into the containment chamber during operation, a significant amount of the debris will be forced up against the filter until the inlet airflow stops which will cause the debris to fall from the filter. The material chute at the bottom exit of the dust collector directs the falling debris into the debris container so that the debris will be directed into the container instead of falling throughout the containment chamber.

The containment chamber is equipped with a covered opening, e.g. door or hatch, of sufficient size to insert and remove the debris container. The containment chamber opening is sealed with gasket material, or equivalent, to be substantially air impermeable when the door is closed. The covering of the opening may be independent for physical removal or may be on hinges as is appropriate for the spatial conditions of the dust collector location. The covering of the opening is constructed of material compatible with the containment chamber and the operating conditions of the dust collection system. Metal, plastic, wood, or structurally supported films and fabric are typical viable material choices for the opening cover. A transparent panel may be included in either the containment chamber or the chamber opening to permit visual observation of the debris container. Plastic or clear film of sufficient strength is typical for the transparent panel.

The application eliminates the direct connection of the dust collector discharge port to the waste debris container by attaching a larger, substantially air-impermeable containment chamber to the dust collector. Typically, waste debris containers are attached directly to the underside of the dust collector using heavy duty clamping mechanisms to keep the debris container in place. When waste debris containers are directly attached in this manner, the airflow into the dust collector will also circulate into the waste debris container, and as such, the waste debris container would need to be made of a heavy-duty material to withstand the force of the airflow. The preferred embodiment eliminates the direct connection between the discharge port and the waste container, and as such, the airflow no longer circulates around the interior of the waste debris container. The now independent debris container can be a durable reusable vessel of varying shapes since no provision is required to facilitate a connection to the dust collector. Additionally, the independent debris container is at equilibrium with the dust collector internal pressure thereby allowing use of a flexible debris bag. Absence of the differential pressure associated with a connected bag eliminates the potential for the bag to be sucked up into the debris outlet port of the negative pressure dust collector. With the debris catch container bearing no burden beyond the weight of debris, inexpensive single use trash bags can be used thereby avoiding the cost of heavy-duty bags. Such a single use bag can be held open by clips or hooks within the containment chamber, attached to a bag stand, or placed inside a durable, reusable vessel.

Incorporation of the application in new designs and new construction would be straightforward by replacing the dust collector legs or stand with a cylindrical, square, rectangular, or other spatially appropriate hopper to serve as the containment chamber. The hopper utilized would be connected to the dust collector body, be structurally capable of supporting the dust collector, be constructed to be substantially air-impermeable, and incorporate a sealed door, hatch or similar opening for debris container management. Metal, plastic, wood, and other similar structural materials would be suitable for the hopper construction.

Application of the application to existing dust collectors would be accomplished by replacing the existing leg structure with a containment chamber similar to the description in the preceding paragraph that includes a method to seal the joint between the bottom of the dust collector body and the top of the containment chamber. The sealing method can be an elastomeric sleeve that is bonded to the containment chamber and secured to the dust collector by a metal or polymer band clamp, e.g. an air-impermeable neoprene sleeve bonded with adhesives or mechanical fasteners to the containment chamber and by reusing the band clamp previously employed to secure a bag to the dust collector. Adhesives, gaskets, and other mechanical sealing methods are also viable options. Alternatively, a smaller free standing containment chamber can be built to fit within the leg structure of the dust collector that is then connected to the dust collector body with adhesives or mechanical devices. For existing cyclone type or other dust collectors with a conical bottom, the containment chamber can be attached to a ring bonded to the cone exterior or connected to the actual dust collector outlet port with equivalent results. The bonding can be done with either adhesives or mechanical devices.

Alternative embodiments of the containment chamber can also exist where inside the interior of the containment chamber there is a ramping device to support and move a bag style debris container under and around the debris chute or debris exit port. The ramping device is structured with a top plate and a bottom plate coupled together using linkage rods. Both the top plate and the bottom plate have sections of material removed from the front of these plates creating a channel through each plate where a debris container can be suspended within the ramping device. Coupled to the top surface of the top plate is an attachment bar which functions as the point of contact for securing the bag style debris container to the ramping device. The attachment bar is a generally circular section of material coupled along the edge of the channel in the top plate. Once secured to the top plate, the attachment bar provides a location where the sides of the debris container can be secured so that the debris container can be suspended in the channels running through both plates.

When a debris container is secured within the containment chamber, it is preferred that the material chute or bottom of the cyclone cone be oriented towards the center opening of the debris container to make sure that the debris container catches any debris. In cases where the top of the debris bag is higher than the bottom of the material chute or cyclone exit, a way is needed to position the debris bag under the debris chute or port and then raise the debris bag top up to utilize the debris bag capacity. The ramping device makes changing the debris container easier as the linkage rods coupling the top plate and the bottom plate together can be rotated moving these plates. When the bottom plate is moved forward, the linkage rods will rotate down along fasteners moving the top plate down as well. As the top plate is lowered, the debris container coupled to top plate will also be lowered moving the debris container down and away from the material chute or cyclone cone making it easier to remove the debris container to be emptied or replaced. Once a fresh debris container is coupled back to the attachment bar, the bottom plate can be pushed back within the containment chamber which will raise the top plate and center the debris container back into place within the dust collector.

Figure 1:
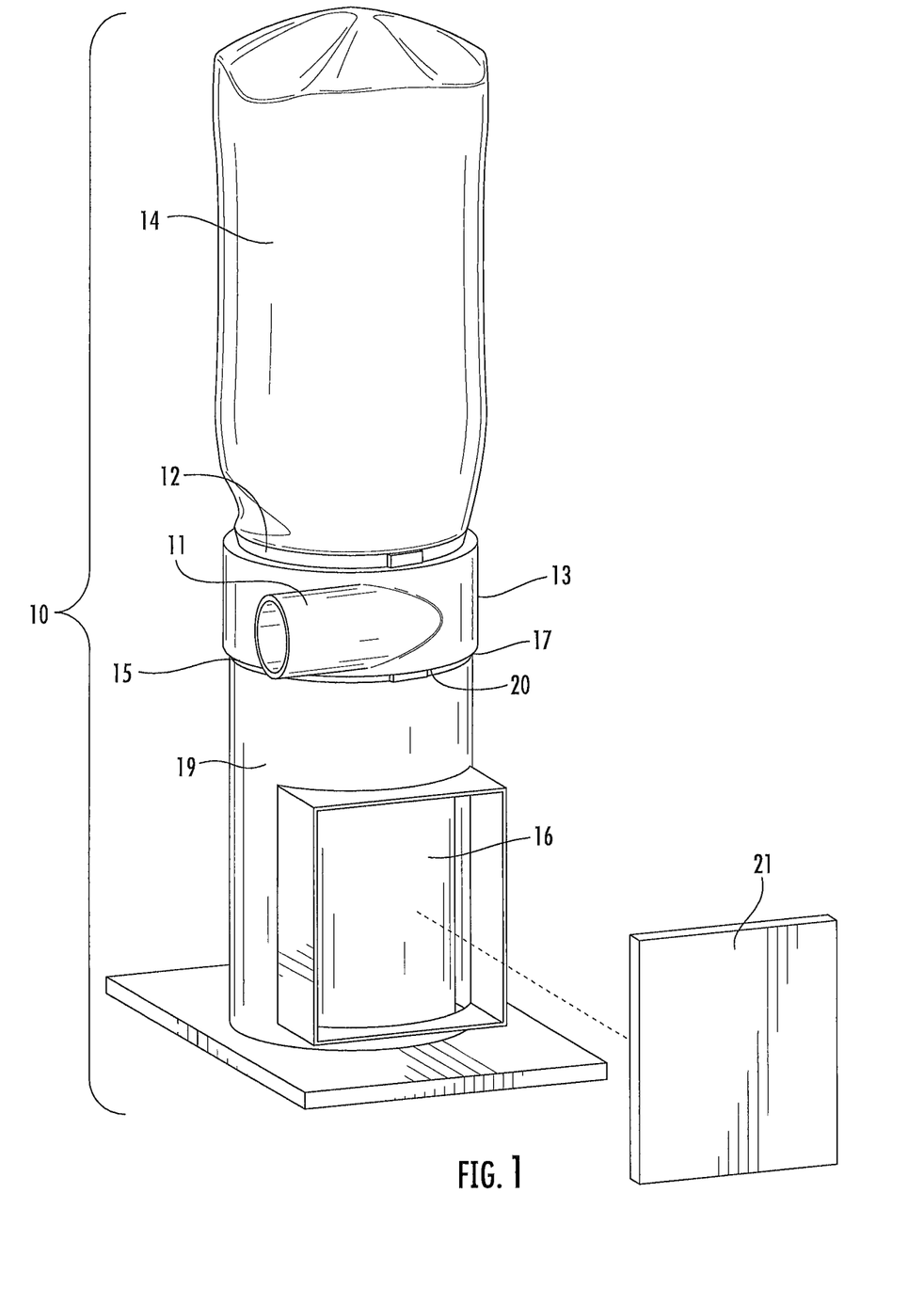
FIG. 1 is a perspective view of a positive pressure system with one preferred embodiment of this application demonstrating a dust collector that would be installed downstream of a blower.
Figure 3:
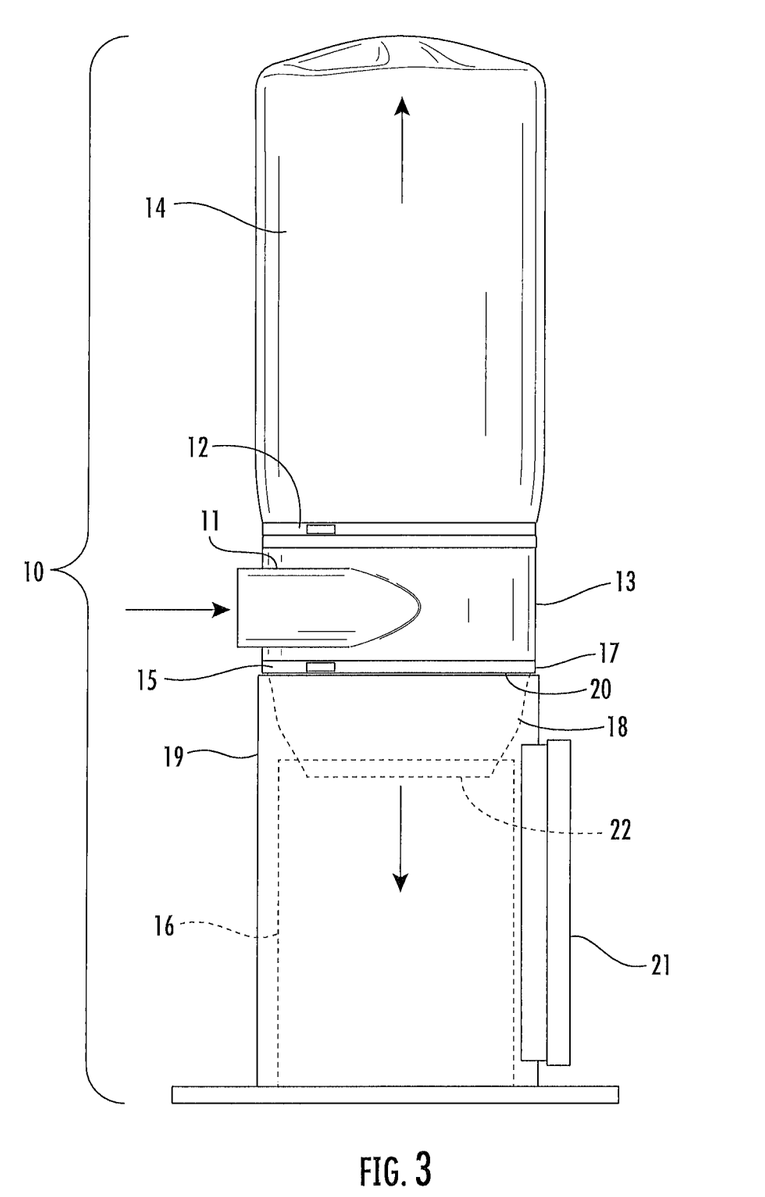
FIG. 3 is a schematic elevation view for the positive pressure system presented in FIG. 1.

Referring to FIGS. 1 and 3 in the drawings, an embodiment of this application for a positive pressure dust collector and debris system 10 is shown. As shown in these figures debris system 10 is comprised of dust collector inlet port 11, filter band clamp 12, dust collector body 13, filter bag/cartridge 14, containment chamber band clamp 15, debris catch container 16, neoprene sleeve 17, debris chute 18, containment chamber 19, debris outlet port 20, removable containment chamber door/hatch 21, and chute outlet port 22. Debris laden air enters the system through the dust collector inlet port 11 which is integrally connected to the dust collector body 13. Air will flow within the interior of dust collector body 13 before exiting the system through a filter bag or filter cartridge 14 secured to the top of the dust collector body 13 by a filter band clamp 12. Once the airflow stops entering inlet port 11, the debris collected by filter 14 will no longer be pushed up against filter 14 and will fall through dust collector body 13, out of debris outlet port 20, and into debris catch container 16. The debris which debris system 10 can be used to collect includes dust, dirt, sawdust, or any other waste particle which can be carried by airflow.

The bottom half of debris system 10 is containment chamber 19 which supports dust collector body 13. Containment chamber 19 may be a cylindrical or a multiple cornered hopper made of metal, wood, plastic or similar sturdy material to both support the dust collector body 13 and the filter bag/cartridge 14 as well as contain the positive pressure of dust collector 10. Containment chamber 19 is equipped with a removable containment chamber door/hatch 21 that can be sealed with gasket material to maintain a substantially air-impermeable containment chamber 19. Containment chamber 19 is sealed to the dust collector body 13 with a neoprene sleeve 17 secured by a containment chamber band clamp 15 and the lower end of the neoprene sleeve 17 is sealed to the containment chamber 19 by an adhesive bond. While an adhesive bond is used in this embodiment, alternative embodiments may also exist where mechanical connections or other sealing means can be used so long as the connection between dust collector body 13 and containment chamber 19 remains air impermeable. By sealing containment chamber 19 and dust collector body 13 together, the connection will be air impermeable which will allow the air pressure to be in equilibrium between these two sections.

Connecting debris outlet port 20 to the interior of containment chamber 19 is debris chute 18 which forms this connection by way of a mechanical connection which in this embodiment is demonstrated as a friction fit. Alternative embodiments may also exist where debris chute 18 is built into the structure of dust collector body 13 instead of being attached to body 13. Debris chute 18 is typically made of metal, plastic, or flexible material extending from the dust collector body 13 into the containment chamber 19 to direct the debris through chute outlet port 22 into the debris catch container 16. In this embodiment, the debris catch container 16 is shown as a durable rigid vessel; however, supported, or free-standing metal, wood, plastic, fabric or paper product vessels may be used as an alternative debris catch container 16. The pressure equilibrium within debris system 10 along with debris catch container 16 not being directly attached to dust collector body 13 allows for versatility in the type of container 16 used as container 16 will not be subject to the strong forces which could cause damage in a typical dust collector.

Figure 2:
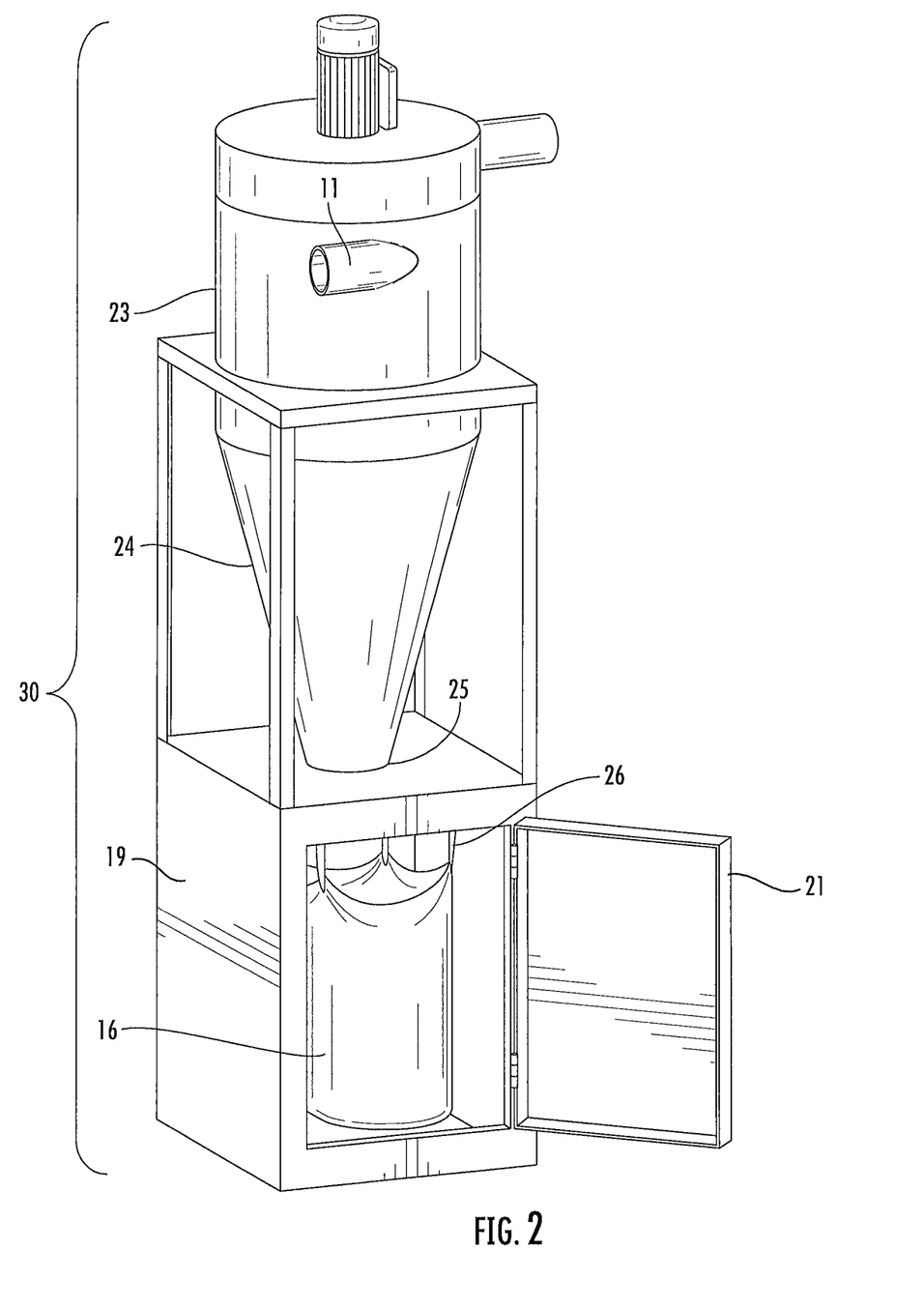
FIG. 2 is a perspective view of a negative pressure system with one preferred embodiment of this application demonstrating a cyclone style dust collector that would be installed upstream of a blower.
Figure 4:
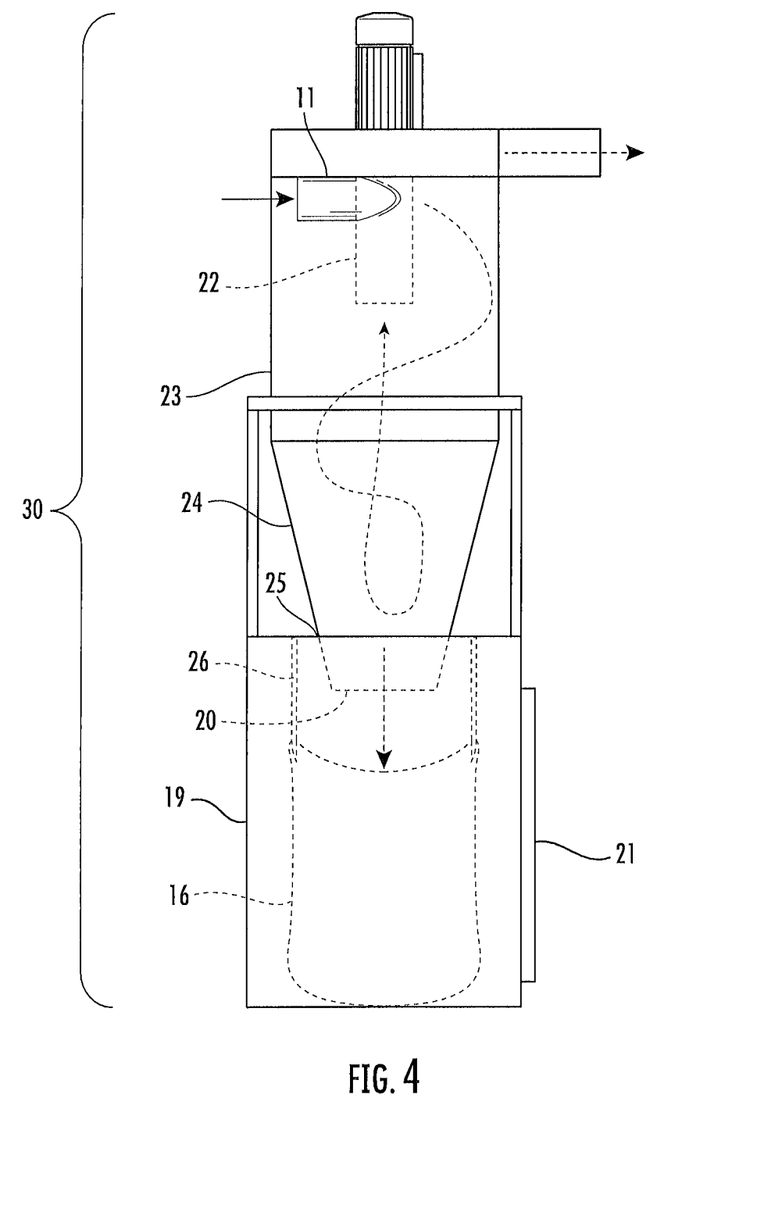
FIG. 4 is a schematic elevation view for the negative pressure system presented in FIG. 2.

Referring now to FIGS. 2 and 4 in the drawings, an embodiment of this application for a negative pressure dust collector and debris system 30 is shown. As shown in these figures debris system 30 is comprised of dust collector inlet port 11, filter bag/cartridge 14, debris catch container 16, containment chamber 19, debris outlet port 20, removable containment chamber door/hatch 21, chute outlet port 22, cyclone barrel 23, cyclone cone 24, connection 25, and bag support straps 26. Similar to debris system 10 in FIGS. 1 and 3, air flow enters debris system 30 at dust collector inlet port 11 and exits out after passing through a filter bag/cartridge 14. However, unlike debris system 10, the body of debris system 30 is a cyclone barrel 23. As the air swirls within cyclone barrel 23 the air will push the debris to the sides of cyclone barrel 23 before peeling away from the wall and exiting the system through a cyclone exit tube 22. At the bottom of cyclone barrel 23 there is cyclone cone 24 which receives the debris discarded by swirling air within barrel 23 and directs the debris out of debris outlet port 20 down towards containment chamber 19.

A containment chamber 19, as described above for debris system 10, is attached to the cyclone cone 24 and is sealed with connection 25. Connection 25 may be either mechanical or adhesive based so long as the connection is air impermeable to allow the pressure within debris system 30 to stay consistent throughout. When sealing cyclone cone 24 and containment chamber 19 together, debris outlet port 20 may or may not extend into the containment chamber 19 depending on how much space there would be between outlet port 20 and debris catch container 16. Debris outlet port 20 is physically in line with the debris catch container 16 and does not use a debris chute 18 to extend the length between outlet port 20 and catch container 16. In debris system 10 the debris chute 18 is used to focus and direct the falling debris along a preferred path. Debris system 30 does not use debris chute 18 as cyclone cone 24 provides the same function of focusing the flow of debris within the system. However, alternative embodiments may also exist where debris system 30 does use a debris chute 18 in combination with cyclone cone 24 to direct the flow of debris within containment chamber 19.

In debris system 30, debris catch container 16 is shown as a flexible bag supported by bag support straps 26. However, alternative embodiments may also exist where free-standing metal, wood, plastic, fabric or paper product vessels are used as an alternative support for debris catch container 16. Containment chamber 19 of debris system 30 may be a cylindrical or multiple cornered hopper made of metal, wood, plastic or similar sturdy material to support the operating conditions. At the designer/builder's discretion containment chamber 19 could support cyclone barrel 23 and cyclone cone 24, but more typically other structural support will be provided for these components.

Figure 5:
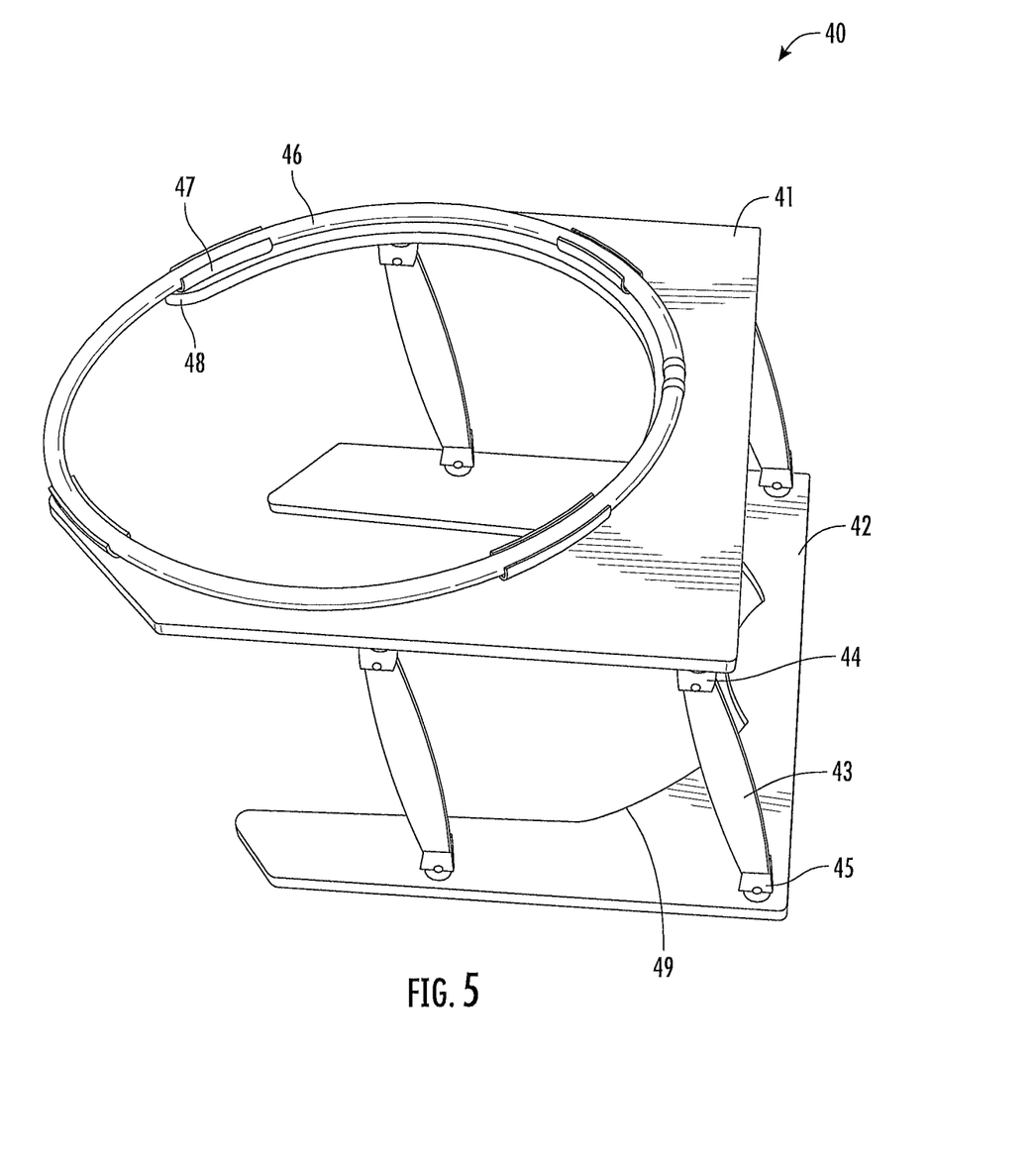
FIG. 5 is a perspective view of a ramping device used in an alternative embodiment of the positive pressure system from FIG. 1.
Figure 6:
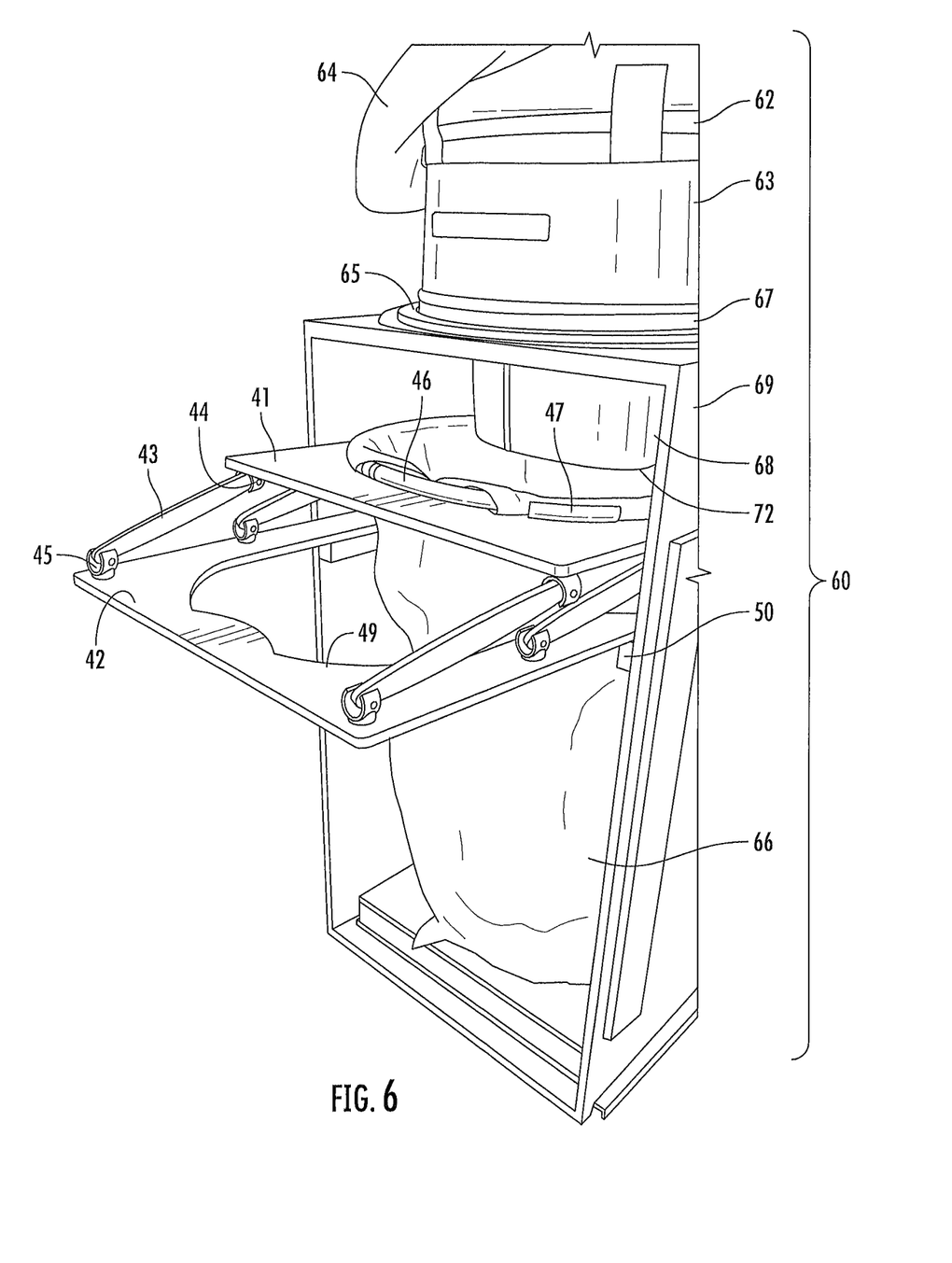
FIG. 6 is a perspective view of a ramping device from FIG. 5 installed inside of the alternative embodiment of the positive pressure system from FIG. 1.
Figure 7:
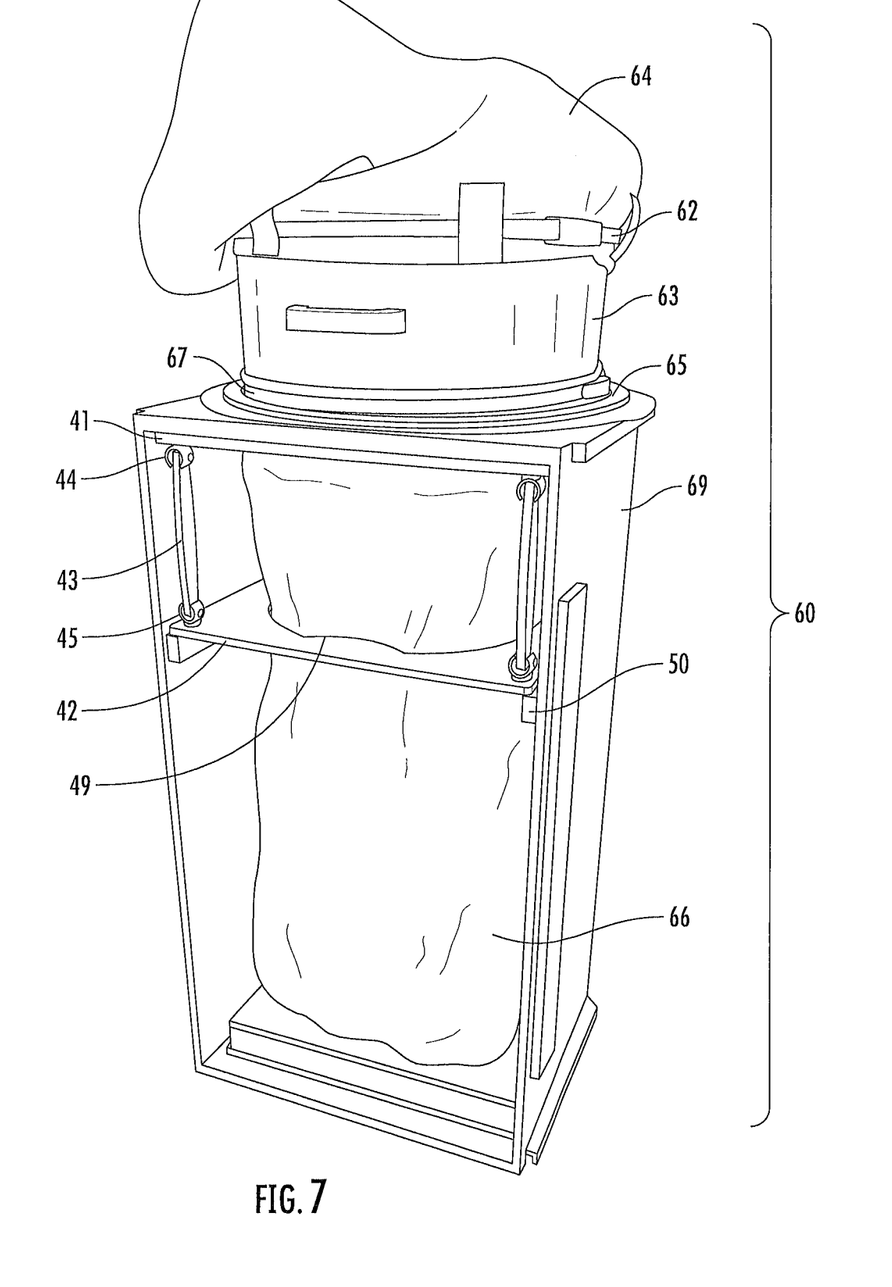
FIG. 7 is a perspective view of a ramping device from FIG. 5 installed inside of the alternative embodiment of the positive pressure system from FIG. 1.

Referring now to FIGS. 5-7 in the drawings, an alternative embodiment of debris system 60 with ramping device 40 is depicted. Debris system 60 has the same structure as a positive pressure dust collector in debris system 10, however, negative pressure duct collectors such as debris system 30 can also be used with ramping device 40. In this embodiment, debris system 60 is comprised of dust collector inlet port 61, filter band clamp 62, dust collector body 63, filter bag/cartridge 64, containment chamber band clamp 65, debris catch container 66, neoprene sleeve 67, debris chute 68, containment chamber 69, debris outlet port 70, removable containment chamber door/hatch 71, and chute outlet port 72. While not every component mentioned above is depicted in FIGS. 5-7, the components of debris system 60 have the same function as the components in debris system 10. However, debris system 60 differs from debris system 10 in that debris system 60 further has ramping device 40 within containment chamber 69. Ramping device 40 is comprised of top plate 41, bottom plate 42, linkage rods 43, top linkage rod connector 44, bottom linkage rod connector 45, attachment bar 46, attachment bar connector 47, top plate channel 48, bottom plate channel 49, and cleats 50. Ramping device 40 provides an alternative way to support debris catch container 66 within containment chamber 69.

Ramping device 40 is structured with top plate 41 and bottom plate 42 coupled together using linkage rods 43. Both top plate 41 and bottom plate 42 are square sections of material with sections of material removed to create top plate channel 48 and bottom plate channel 49. Both top plate channel 48 and bottom plate channel 49 are positioned through the front surface of top plate 41 and bottom plate 42 and provide a location for debris container 66 to be stored within ramping device 40. Attached to the top surface of top plate 41 along top plate channel 48 using attachment bar connectors 47 is attachment bar 46. Attachment bar connectors 47 are c-channels secured to the top surface of top plate 41 and positioned along top plate channel 48 for securing attachment bar 46 to top plate 41. Attachment bar 46 is generally circular in shape with the circular perimeter providing a location to couple the top of debris catch container 66 within ramping device 40. Securing debris catch container 66 within top plate channel 48 will allow individuals to move container 66 with top plate 41 when bottom plate 42 is pulled forward.

Four linkage rods 43 are depicted in FIGS. 5-7 for coupling top plate 41 and bottom plate 42 together. While four linkage rods 43 are seen in the current embodiment, alternative embodiments may also exist where more than four linkage rods 43 are used or where there are less than four linkage rods 43 used. Linkage rods 43 are fastened within top linkage rod connector 44 on the bottom surface of top plate 41 and bottom linkage rod connector 45 on the top surface of bottom plate 42 to couple top plate 41 to bottom plate 42. While connector 44 is shown on the bottom surface of top plate 41 and connector 45 is shown on the top surface of bottom plate 42, it is understand that alternative embodiments may also exist where connectors 44 and 45 are present on other surfaces of plates 41 and 42. Connectors 44 and 45 are c-channels with a top channel opening and two side openings which allow linkage rods 43 to rotate along the fasteners in connectors 44 and 45 to move top plate 41 or bottom plate 42 forwards or backwards relative to each other. These different positions are depicted in FIGS. 6 and 7 when bottom plate 42 is pulled forward along cleats 50 within containment chamber 69. Cleats 50 are secured within containment chamber 69 and function as a rail that bottom plate 42 moves along. When bottom plate 42 is moved forward, as shown in FIG. 6, linkages 43 will rotate pulling top plate 41 down along with debris catch container 66. When top plate 41 and debris catch container 66 are moved down in this manner, debris chute 68 is no longer positioned inside of catch container 66 which allows an individual to remove container 66 quickly and efficiently. Once debris catch container 66 has been replaced, pushing bottom plate 42 back along cleats 50 into containment chamber 69 will raise top plate 42 and debris container 66 back into position within containment chamber 69.

While multiple embodiments have been shown and discussed hereinabove, many variations, orientations, and re-configurations are possible without departing from the main principles of this application. The units may be made of a wide variety of materials as need be for different purposes.

It is apparent that a system with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A dust collector, comprising:
   a dust collector body, comprising:
      at least one inlet port disposed on a side of the dust collector body for receiving a dust-laden air stream;
      at least one top opening disposed through a top of the dust collector body for expelling air;
      at least one filter coupled to the at least one top opening for extracting dust from expelled air; and
      a debris outlet port disposed through a bottom of the dust collector body; and
   a debris containment chamber sealed to the bottom of the dust collector body, the debris containment chamber comprising:
      a housing having a sealed containment chamber door, the housing being sealed to the dust collector body;
      an opening in the housing through which passes debris from the dust collector body; and
      a removable debris catch container disposed within the housing for receiving the debris from the dust collector body;
   wherein the debris catch container is not sealed to the dust collector body, such that the pressure within the debris catch container remains in equilibrium with the pressure within the housing during operation wherein the debris catch container is a flexible bag disposed within a rigid container.

2. The dust collector of claim 1, wherein the dust collector is a positive pressure dust collector.

3. The dust collector of claim 1, wherein the dust collector is a negative pressure dust collector.

4. The dust collector of claim 3, wherein the dust collector body is cylindrical in shape.

5. The dust collector of claim 4, wherein the dust collector body further comprises:
   a cyclone cone disposed on a bottom of the dust collector body;
   wherein the debris outlet port is disposed through a bottom of the cyclone cone.

6. The dust collector of claim 1, wherein the at least one filter is a filter bag.

7. The dust collector of claim 1, wherein the at least one filter is a filter cartridge.

8. The dust collector of claim 1, wherein the dust collector body further comprises:
   a debris chute extending from the debris outlet port into the housing for directing the fall of debris.

9. The dust collector of claim 1, wherein the debris containment chamber is adhesively bonded to the dust collector body.

10. The dust collector of claim 1, wherein the containment chamber door is sealed to the containment chamber using a gasket material.

11. The dust collector of claim 1, wherein the containment chamber door is formed at least partially from transparent material.

12. The dust collector of claim 1, wherein the debris catch container is a flexible bag.

13. The dust collector of claim 1, wherein the debris catch container is a rigid container.

14. The dust collector of claim 1, wherein the debris containment chamber further comprises:
   a ramping device operably associated with the debris containment chamber.

15. The dust collector of claim 14, wherein the ramping device comprises:
   a top plate, comprising:
      a channel disposed through a surface of the top plate for receiving the debris catch container; and
      at least one linkage rod connector disposed on a surface of the top plate;
   a bottom plate, comprising:
      a channel disposed through a surface of the bottom plate for receiving the debris catch container; and
      at least one linkage rod connector disposed on a surface of the bottom plate;
   at least one linkage rod coupling the top plate to the bottom plate; and
   at least one attachment bar coupled to the top plate for receiving the debris catch container.

16. The dust collector of claim 15, wherein the containment chamber further comprises:
   at least one cleat for receiving the bottom plate;
   wherein the bottom plate is movable along a surface of the at least one cleat.

17. The dust collector of claim 16, wherein the top plate and the bottom plate will move relative to each other when one plate is moved, such that pulling the bottom plate along the at least one cleat will either lower or raise the top plate.

\* \* \* \* \*